United States Patent [19]

Bland

[11] 3,876,557

[45] Apr. 8, 1975

[54] METALLIC CATALYST

[76] Inventor: Jackie Lou Bland, 110 Olde English Ct., Louisville, Ky. 40272

[22] Filed: June 29, 1973

[21] Appl. No.: 375,087

[52] U.S. Cl. ............ 252/466 J; 252/473; 252/474; 252/472; 252/475; 260/449 M
[51] Int. Cl. ............................................. B01j 11/22
[58] Field of Search......... 252/466 J, 473, 474, 472, 252/475

[56] References Cited
UNITED STATES PATENTS

| | | | |
|---|---|---|---|
| 1,168,404 | 1/1916 | Lucas | 252/472 |
| 1,502,260 | 7/1924 | Lucas | 252/466 J |
| 1,746,781 | 2/1930 | Lazier | 252/475 |
| 2,077,409 | 4/1937 | Graves | 252/475 |
| 2,605,239 | 7/1952 | Sears | 252/475 |
| 2,852,570 | 9/1958 | Conradin et al. | 252/473 |
| 3,032,515 | 5/1962 | Hinsvark | 252/466 J |
| 3,033,802 | 5/1962 | Pedigo | 252/466 J |
| 3,068,290 | 12/1962 | Lichtenberger | 252/473 |
| 3,317,574 | 5/1967 | Morita | 252/62.56 |
| 3,617,518 | 11/1971 | Sinfelt | 252/474 |

*Primary Examiner*—Arthur P. Demers

[57] ABSTRACT

A catalyst prepared from the heat treatment of a mixture of at least two metallic salts, the metallic salts being prepared from a controlled simultaneous precipitation of a homogeneous mixture of inorganic compounds of the metals.

7 Claims, No Drawings

METALLIC CATALYST

BACKGROUND OF THE INVENTION

This invention relates to a metallic catalyst. More particularly, this invention relates to a catalyst prepared from a homogeneous mixture of metallic salts. Even more particularly, this invention relates to a metallic catalyst prepared from a homogeneous mixture of metallic salts wherein one of the metallic salts is a nickel salt.

Metallic catalysts have long been used in the hydrocracking of petroleum; hydrogenation of fats and oils; reforming of hydrocarbons; methanation of oxides of carbon in the presence of hydrogen; hydrogenation of unsaturated aromatics, nitriles, and other functional groups; oxidation of hydrocarbons; and the like. Generally, these catalysts have been prepared from the calcination or the hydrogen reduction of a unitary inorganic compound or when two or more metals are used, by physically mixing the metallic catalysts.

SUMMARY OF THE INVENTION

It is an object of this invention to provide a catalyst having new and improved catalytic properties. It is another object of this invention to provide a catalyst which is useful in a number of organic chemical reactions. It is a further object of this invention to provide a catalyst from a homogeneous mixture of metallic salts. Other objects and advantages of his invention will becomme apparent to those skilled in the art upon consideration of the accompanying disclosure.

The present invention resides in a metallic catalyst. Broadly speaking, the catalyst is a mixture of metals prepared from a controlled simultaneous precipitation of a homogeneous mixture of metallic salts. More specifically, the catalyst composition of this invention is a metallic catalyst composition comprising a homogeneous mixtur of metallic complexes prepared from the heat treatment of a mixture of at least two metallic salts, the metallic salts being prepared from a controlled simultaneous precipitation of a homogeneous mixture of inorganic compound of the metals. The catalyst may also include a sstisfactory support material with which the metallic organic salt is precipitated.

The metallic inorganic compounds which may be used in preparing the metallic salts of this invention include the metallic inorganic compounds selected from the group consisting of metallic inorganic salts, hydroxides and oxides as well as alkaline earth metal inorganic salts, hydroxides and oxides.

The metallic inorganic salts which may be used in this invention include, for example, the carbonates, bicarbonates, amine carbonates, nitrates, chlorides, sulfates, fluorides, bromides and iodides of nickel, cobalt, iron, copper, zinc, zirconium, aluminum, and the like.

The metallic oxides and hydroxides which may be used in this invention include, for example, the oxides and hydroxides of nickel, cobalt, iron, copper, zinc, zirconium, aluminum and the like.

The alkaline earth metal inorganic salts which may be used in this invention include, for example, carbonates, bicarbonates, nitrates, chlorides, sulfates, fluorides, bromides, and iodides of barium, calcium, strontium, magnesium and the like.

The alkaline earth metal oxides and hydroxides which may be used in this invention include, for example, hydroxides and oxides of barium, calcium, strontium, magnesium and the like.

In the precipitation of metallic salts from the homogeneous mixture of inorganic compounds, the precipitation is carried out under controlled conditions wherein the homogeneous mixture of metals are precipitated simultaneously. In the precipitation of these metals, either an organic or an inorganic acid may be used.

Organic acid which may be utilized in this invention includes the short chain aliphatic acids, such as acetic, formic, oxalic, tartaric, malic, and the like. It is also realized that non-aliphatics may also be used in combination with any of the aforementioned organic acids.

Satisfactory support materials which may be used in the present invention include, for example, kieselguhr, aluminas, magnesias, and the like.

It has been found that catalysts prepared according to the present invention have improved catalytic activity in the reforming of hydrocarbons, methanation of oxides of carbon in the presence of hydrogen, oxidation of hydrocarbons, and hydrocracking of petroleum, and the hydrogenation of fatty acids and vegetable oils.

Catalysts of the present invention have been found to have improved stability of performance and retention of activity, particularly, at operating temperatures of 500° to 1800° F. More particularly, in the methanation of oxides of carbon in the presence of hydrogen, methane and steam, it has been found that a high percentage of the carbon in the oxides of carbon can be converted to a methane in a gas stream where the carbon oxides content is above 20 per cent by volume and the feed inlet temperatures are in the range of 500° to 1300° F.

In a preferred embodiment of formulating a catalyst composition of this invention, to an aqueous slurry containing from about 1 to 3 parts by weight of nickel as carbonates of nickel and from about 3 to 1 parts by weight of cobalt as carbonates of cobalt is added from about 0.5 to 4.0 by weight of magnesium oxides. This resulting slurry mix is then agitated vigorously and an aqueous solution containing from about 10 to 15 per cent by weight of oxalic acid is added until the pH of the stirred solution is from about 1.0 to 3.0. The resulting slurry solution containing oxalates of the metals is then filtered with the residue being dried at generally from about 220° to about 260° F. The dried oxalates are then subjected to a heat treatment of from about 520° to 750° F in an inert or reducing atmosphere, such as hydrogen, for a period of from about 1 to 3 hours to break down the oxalates and reduce the metals to their metallic or stable oxide state. The reduced metals are then generally cooled in an atmosphere of carbon dioxide and oxygen, the carbon dioxide being from about 95 to 100 percent by weight. The resulting powdered product may then be used as a catalyst in its present powdered condition or may be further treated or pelletized for use as a catalyst.

A more complete understanding of the invention can be obtained by considering the following examples. However, it should be understood that these examples are not intended to be unduly limitative of the invention.

EXAMPLE I

The following example demonstrates the procedure that was followed in preparing a nickel-cobalt catalyst of the present invention.

A nickel-cobalt oxalate was prepared by adding 141.4 grams of nickel carbonate at a 49.5 percent by weight nickel and 152.0 grams of cobalt carbonate at a 46.0 percent by weight cobalt in a glass container containing 2 liters of water to form a slurry. To this slurry, at room temperature, was added 260 grams of magnesium oxide. To this slurry, an acid solution containing about 10% by weight of oxalic acid was added. The oxalic acid was added until the solution reached a constant pH of about 2.0 which was about 11,000 milliliters of oxalic acid solution. The resulting slurried solution containing insoluble oxalates of nickel, cobalt and magnesium was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours, to 85° F, the concentration of carbon dioxide being greater than 99 percent by weight.

The resulting catalyst was found to possess catalytic activity in many hydrogenation reactions.

EXAMPLE II

The following example demonstrates the procedure that was followed in preparing a nickel-cobalt catalyst of the present invention.

A nickel-cobalt oxalate was prepared by adding 202 grams of nickel carbonate at a 49.5 percent by weight nickel and 217.4 grams of cobalt carbonate at a 46.0 percent by weight cobalt in a glass container containing 2 liters of watet to form a slurry. To this slurry, an acid solution containing about 10% by weight of oxalic acid was added. The oxalic acid was added until the solution reached a constant pH of about 2 which was about 4,200 milliliters of oxalic acid solution. The resulting slurried solution containing insoluble oxalates of nickel and cobalt was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours, to 85° F, the concentration of carbon dioxide being greater than 99 percent by weight.

The resulting catalyst was found to possess catalytic activity in many hydrogenation reactions.

EXAMPLE III

The following example demonstrates the procedure that was followed in preparing a nickel-cobalt catalyst of the present invention.

A nickel-cobalt oxalate was prepared by adding 141.5 grams of nickel carbonate at a 49.5 percent by weight nickel and 152.5 grams of cobalt carbonate at a 46.0 percent by weight cobalt in a glass container containing 3 liters of water to form a slurry. To this slurry, at room temperature, was added 325.0 grams of aluminum hydrate (75% $Al_2O_3$). To this slurry, an acid solution containing about 10% by weight of oxalic acid was added. The oxalic acid was added until the solution reached a pH of about 1.0 which was about 3,200 milliliters of oxalic acid solution. The resulting slurried solution containing insoluble oxalates of nickel and cobalt was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours, to 85° F, the concentration of carbon dioxide being greater than 99 percent by weight.

The resulting catalyst was found to possess catalytic activity in many hydrogenation reactions.

EXAMPLE IV

The following example demonstrates the procedure that was followed in preparing a nickel-cobalt catalyst of the present invention.

A metallic oxalate was prepared by mixing 70.8 grams of nickel carbonate at a 49.5 percent by weight nickel, 76.3 grams of cobalt carbonate at a 46.0 percent by weight cobalt, 130.0 grams of magnesium oxide, and 437.1 grams of oxalic acid and adding such mixture at a slow rate with vigorous stirring to a glass container containing 1.8 liters of water. The rate of addition of the mixture to the water was maintained at such a rate that the pH of the solution never exceeded 2.0 and the final pH was 1.0. The resulting slurried solution containing the insoluble oxalates was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours to 85° F, the concentration of carbon dioxide being greater than 99 percent by weight.

The resulting catalyst was found to possess catalytic activity in many hydrogenation reactions.

EXAMPLE V

The following example demonstrates the procedure that was followed in preparing a nickel-cobalt catalyst of the present invention.

A nickel-cobalt oxalate was prepared by adding 88.5 grams of nickel carbonate at a 49.5 percent by weight nickel and 95.5 grams of cobalt carbonate at a 46.0 percent by weight cobalt in a glass container containing 190.0 grams of nitric acid as a 1 N solution to form nitrates of nickel and cobalt. To this solution, 189.0 grams of about 10% by weight of oxalic acid was added. The resulting slurried solution containing insoluble oxalates of nickel and cobalt was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours, to 85° F, the concentration of carbon dioxide being greater than 99 percent by weight.

The resulting catalyst was found to possess catalytic activity in many hydrogenation reactions.

EXAMPLE VI

The following example demonstrates the procedure that was followed in preparing a nicel-zirconium catalyst of the present invention.

A nickel-zirconium oxalate was prepared by adding 65.7 grams of nickel carbonate at a 49.5 percent by weight nickel, 8.4 grams of freshly prepared zirconium hydroxide at a 55.0 percent by weight zirconium and 19.0 grams of Filter Cel (John Mansville's trade name for diatamaceous earth) in a glass container containing 0.5 liters of water to form a slurry. To this slurry, 78 grams of oxalic acid containing about 12.5% by weight of oxalic acid was added. The resulting slurry had a pH of 1.5. The slurried solution containing insoluble oxalates of nickel and zirconium was then filtered and the residue was dried at 250° F for about 8 hours.

The aforementioned oxalates were then reduced under a hydrogen atmosphere at 680° F for a period of 3 hours. This reduced product was then cooled in the hydrogen atmosphere to 210° F, the resulting reduced powder being transferred into molten hydrogenated vegetable oil. The resulting product was then chilled and flaked.

The resulting catalyst was found to possess good catalytic activity in the hydrogenation of fatty acids and excellent selectivity in the hydrogenation of vegetable oils.

EXAMPLE VII

The following example demonstrates the procedure that was followed in preparing a nickel-cobalt catalyst of the present invention.

A nickel-cobalt oxalate was prepared by adding 74.7 grams of nickel carbonate at a 49.5 percent by weight nickel and 74.9 grams of cobalt carbonate at a 49.0 percent by weight cobalt in a glass container containing 0.75 liters of water to form a slurry. To this slurry, 255 grams of an oxalic acid solution containing about 10% by weight of oxalic acid was added. The resulting slurried solution containing insoluble oxalates of nickel and cobalt was then filtered and the residue was dried at 250° F for about 8 hours.

The aforementioned oxalates were then reduced under a hydrogen atmosphere at 680° F for a period of 3 hours. This reduced product was then cooled in a substantially carbon dioxide atmosphere for 4 hours, to 85° F, the concentration of carbon dioxide being greater than 99 percent by weight.

The resulting catalyst was found to possess catalytic activity in many hydrogenation reactions.

EXAMPLE VIII

The following example demonstrates the procedure that was followed in making pellets from a catalyst of the present invention.

The reduced and stabilized product of Example I was made into 5/32 × 5/32 inch pellets by admixing 100 grams of catalyst with 1.5 grams of graphite. The mixture was tableted utilizing a Colton tableting machine.

EXAMPLE IX

The following example demonstrates the procedure that was followed in making ring pellets from a catalyst of the present invention.

The reduced and stabilized product of Example I was made into 5/8 × 3/8 × 1/4 inch ring pellets by admixing 1,000 grams of catalyst with 15 grams of graphite. This mixture was tableted utilizing a Stokes ring tableting machine.

EXAMPLE X

The following example demonstrates the procedure that was followed in a methanation reaction utilizing a catalyst of the present invention.

To a reactor 7 inches in height and 0.75 inches, I.D. for methanation tests, 40 grams of the catalyst of Example VIII were charged. Initially, gaseous composition containing 55.1 percent by weight $H_2$, 26.9 percent by weight of $CO_2$, and 14.8 percent by weight of $CH_4$ was passed over the catalyst at a fluid space velocity of 5,000 and a pressure of 300 psig, (The fluid space velocity is defined as the volume of fluid passed over a volume of catalyst per hour under standard conditions of temperature and pressure). The inlet temperature of the gas to the reactor was maintained at about 900° F and the outlet temperature was about 1,000° F. The effluent gaseous composition was found to contain 20.9 percent by weight of $H_2$, 29.9 percent by weight of CO and 48.9 percent by weight of $CH_4$.

The catalyst was kept on steam for a total of 44 days with the outlet temperature of the gas remaining approximately the same as those entering initially. At the end of the 44 day operating period, the gaseous composition entering the reactor was found to contain 58.2 percent by weight of $H_2$, 22.6 percent by weight of $CO_2$, and 17.4 percent by weight of $CH_4$. The effluent gaseous composition was found to contain 28.2 percent by weight of $H_2$, 1.5 percent by weight of CO, 20.8 percent by weight of $CO_2$, and 50.8 percent by weight of $CH_4$.

EXAMPLE XI

The following example demonstrates the procedure that was followed in a methanation reduction utilizing a catalyst of the present invention.

To a reactor 7 inches in height and 0.75 inches I.D. for methanation tests, 40 grams of the tableted 5/16 inch catalyst of Example VIII were charged. A gaseous composition containing 60 percent by weight $H_2$, 24 percent by weight of $CO_2$, and 16 percent by weight of $CH_4$ was passed over the catalyst at a fluid space velocity of 5000, at a feed gas temperature of 900° F and a pressure of 300 psig. (The fluid space velocity is defined as the volumes of fluid passed over a volume of catalyst per hour under standard conditions of temperature and pressure.

The effluent gaseous composition (dry basis) leaving the bottom of the catalyst bed at 1,000° F was found to contain 26.5 percent by weight of $H_2$, 23.0 percent by weight of $CO_2$, 1.0 percent by weight of CO and 49.5 percent by weight of $CH_4$.

EXAMPLE XII

The following example demonstrates the procedure that was followed in a methanation reaction utilizing a catalyst of the present invention.

To a reactor 7 inches in height and 0.75 inches in I.D for methanation tests 40 grams of the catalyst of Example VIII were charged. A gaseous composition containing 55 percent by weight $H_2$, 14 percent by weight of CO, 14 percent by weight of $CO_2$ and 17 percent by weight of $CH_4$ was passed over the catalyst at a fluid space velocity of 5,000, at a temperature of 900° F and a pressure of 300 psig. (The fluid space velocity is defined as the volumes of fluid passed over a volume of catalyst per hour under standard conditions of temperature and pressure).

The effluent gaseous composition (dry basis) leaving the bottom of the catalyst bed at 1,020° F was found to contain 27.7 percent by weight of $H_2$, 3.0 percent by weight of CO, 23.9 percent by weight of $CO_2$, and 45.4 percent by weight of $CH_4$.

What is claimed is:

1. A metallic catalyst composition comprising homogeneous mixture of metallic complexes prepared from the heat treatment in a reducing or inert atmosphere of at least two substantially insoluble metallic oxalates, one of said metallic oxalates being an oxalate of nickel and the second metallic oxalate being selected from the group consisting of salts of cobalt, iron, copper, zinc, zirconium, aluminum, barium, calcium, strontium, and magnesium and combinations thereof wherein said mixture is in the ratio of from about 0.3 to 3.0 parts by weight of nickel to 1.0 parts by weight of total second metal to form a stable metallic complex, the metallic oxalates being prepared from a controlled simultaneous precipitation of homogeneous mixture of substantially insoluble inorganic compounds selected from the group consisting of oxides, hydroxides, carbonates and bicarbonates of the metals wherein the controlled simultaneous precipitation of said homogeneous mixture of nickel and said second metal occurs in the presence of oxalic acid at a pH of from about 1.0 to 3.0, said second metal being selected from the group consisting of cobalt, iron, copper, zinc, zirconium, aluminum, barium, calcium, strontium, and magnesium and combinations thereof.

2. The catalyst of claim 1 wherein said second metal is cobalt.

3. The catalyst of claim 2 wherein said mixture of nickel and cobalt is approximately 1.0 part by weight of nickel to 1.0 part by weight of cobalt.

4. The catalyst of claim 2 including the addition of oxides of magnesium in the precipitation of said homogeneous mixture of nickel and cobalt.

5. The catalyst of claim 1 wherein said heat treatment occurs in a hydrogen atmosphere at a temperature of from about 520° to 750° F and the heat treated product is cooled in a carbon dioxide atmosphere of from about 95 to 100 percent by weight.

6. A method of preparing a catalyst which comprises the steps of converting a slurry of a homogeneous mixture of nickel and cobalt carbonates and bicarbonates into their oxalates by adding an oxalic acid solution to said inorganic compounds until the pH of the resulting solution is between about 1.0 and 3.0, filtering the resulting mixture of nickel and cobalt oxalates from said resulting solution, drying the filtered product, reducing the oxalates to their metallic state in an atmosphere of hydrogen, and stabilizing the metals in an atmosphere of predominantly carbon dioxide.

7. The method of claim 6 wherein the reducing of said oxalate to its metallic state in a hydrogen atmosphere is carried out at a temperature of from about 520° to 750° F for a period of from about 1 to 3 hours.

* * * * *